(12) United States Patent
Stehouwer

(10) Patent No.: US 8,146,442 B2
(45) Date of Patent: Apr. 3, 2012

(54) DEVICE AND METHOD FOR MEASURING A FLOW CHARACTERISTIC OF A FLUID IN A CONDUIT

(75) Inventor: Arjan Stehouwer, Zeewolde (NL)

(73) Assignee: Elster NV/SA (BE)

( * ) Notice: Subject to any disclaimer, the term of this patent is extended or adjusted under 35 U.S.C. 154(b) by 489 days.

(21) Appl. No.: 12/508,862

(22) Filed: Jul. 24, 2009

(65) Prior Publication Data

US 2011/0016985 A1 Jan. 27, 2011

(51) Int. Cl.
*G01F 1/66* (2006.01)
(52) U.S. Cl. .................................... 73/861.27
(58) Field of Classification Search .. 73/861.27–861.29, 73/861.31; 702/79.29
See application file for complete search history.

(56) References Cited

U.S. PATENT DOCUMENTS

| | | | |
|---|---|---|---|
| 3,940,985 A * | 3/1976 | Wyler | 73/861.31 |
| 4,102,186 A * | 7/1978 | Brown | 73/861.27 |
| 5,546,812 A | 8/1996 | Drenthen | |
| 7,942,068 B2 * | 5/2011 | Ao et al. | 73/861.31 |

FOREIGN PATENT DOCUMENTS

DE 29719730 12/1998

OTHER PUBLICATIONS

European Search Report dated Jan. 7, 2010 for related European Application No. EP09166232.

* cited by examiner

*Primary Examiner* — Jewel V Thompson
(74) *Attorney, Agent, or Firm* — Ryan A. Schneider, Esq.; Troutman Sanders LLP

(57) ABSTRACT

A device for determining a flow characteristic, in particular flow velocity, of a fluid in a conduit, comprises a conduit body (110), at least four pairs of ultrasonic transducers (116, 118; 122, 124; 128, 130; 132, 1340 defining swirl sensitive acoustic paths (128, 130; 132, 134). The ultrasonic transducers are arranged such that they define paired acoustic paths. The device also comprises means (142, 144) for measuring the transit times of transmitted ultrasonic waves and for determining a flow characteristic from the measured transit times.

9 Claims, 4 Drawing Sheets

DEVICE AND METHOD FOR MEASURING A FLOW CHARACTERISTIC OF A FLUID IN A CONDUIT

BACKGROUND

The present invention relates to ultrasonic flow measurement, in particular a device and method for measuring a flow characteristic, e.g. flow velocity and/or throughput of a fluid in a conduit.

Ultrasonic flow measurement of fluids flowing in a conduit is generally known in the art. Basically it comprises transmitting ultrasonic sound waves between a transmitter and a receiver, that are spaced apart in axial direction of a conduit, in a downstream direction of the fluid flow and in the upstream direction thereof. The transit time of the ultrasonic waves is measured. From the difference in transit time of the downstream directed ultrasonic wave and the upstream directed wave an average flow velocity or throughput can be calculated based on a known geometry of the conduit. The fluid is a gas, vapour or liquid, such as natural gas.

In addition to the flow velocity, the transit time as measured is dependent from the flow profile of the fluid in the conduit. Swirl, cross flow, profile asymmetry and a velocity fluctuating in time are known distortions from an ideal flow profile, which frequently occur in practice, e.g. in complex piping structures, after bends and the like.

The ultimate reliability of the flow velocity as measured and calculated depends on many parameters, like the distance covered, the acoustic path configuration, transmitted ultrasonic wave type and the calculation method itself. Many acoustic path configurations are known in the art.

One of the known acoustic path configurations is a triangular path having midradius chords, wherein the ultrasonic wave transmitted by the transmitter reflects twice at the inner conduit wall prior to being received by the receiver. E.g. U.S. Pat. No. 5,546,812 has disclosed a method and device for determining characteristics of the flow of a medium in a channel, comprising a transducer arrangement defining two triangular paths offset to each other for swirl determination and three single reflection axial paths also offset to each other for (a)symmetry determination. In commercially available flow meters according to this patent, the first triangular path has a clockwise orientation and the second triangular path has a counter clockwise orientation.

Despite the well recognized excellent performance of these known devices, some tests have shown that the accuracy of the measured characteristics, in particular flow velocity and diagnostics such as swirl angle and asymmetry derived from the swirl paths or combination thereof, leaves something to be desired in some situations. This is particularly true if there is an asymmetry in a certain orientation or if the flow profile changes along the axial distance of the triangular acoustic path, thereby affecting the flow measurement accuracy. Using these known devices it is not possible to fully compensate or eliminate such an effect to an acceptable level. Moreover, in general demands on reducing uncertainty and on improving accuracy of flow meters still increase. Therefore there is a continuing need for improving the accuracy of ultrasonic flow meters and reducing the uncertainty thereof.

SUMMARY

An object of the present invention is to provide an ultrasonic flow measurement device and method having an improved accuracy, even in situations where the flow profile is asymmetric and/or the flow profile changes in the axial distance of the acoustic paths, in particular the triangular paths.

Accordingly a device and method for measuring flow velocity of a fluid in a conduit according to the present invention are defined in claim 1 and claim 5 respectively.

Shortly said, the device according to the invention comprises a conduit body and at least four pairs of ultrasonic transducers, wherein each pair defines a swirl sensitive acoustic path. The transducers of each pair are arranged spaced apart in the axial direction of the conduit along imaginary lines parallel to the conduit axis. Two swirl sensitive paths with their transducers along lines at the same side of the conduit body form a pair of ultrasonic paths, hereinafter also called paired paths. The device according to the invention comprises two sets of paired paths, the sets being positioned along different parallel lines. The transducers are capable of acting individually as a transmitter and receiver for transmitting ultrasonic waves along their respective acoustic paths and receiving thereof. The device also comprises means for measuring the transit times of transmitted ultrasonic waves and for determining a flow characteristic from the measured transit times.

In a more detailed description, a device according to the present invention comprises a conduit body, generally having an inner circular cross section. Transducers capable of emitting ultrasonic waves and receiving ultrasonic waves, are mounted on or in the wall of the conduit body. Measuring means capable of receiving signals from the transducers, determine the transit times of the acoustic waves transmitted along the various acoustic paths defined by the transducer pairs. Calculation means can process the transit times using algorithms into the desired characteristic, in particular flow velocity, swirl angle, asymmetry, diagnostics and/or throughput. In the device according to the invention a first pair of ultrasonic transducers is arranged at positions spaced apart from each other in the axial direction of the conduit body along a first line parallel to the conduit axis and is directed such that the ultrasonic transducers establish a first swirl sensitive acoustic path between them. Thus the first swirl sensitive path extends in axial direction of the conduit body. A second pair of ultrasonic transducers is arranged at an axial distance from one another along a second line, which is preferably at the position of the first line, such that the ultrasonic transducers thereof have a second swirl sensitive acoustic path between them, but in an opposite direction to the first swirl sensitive acoustic path as seen in the same axial direction. This means that the first and second swirl sensitive paths together have a clockwise (CW) and a counter clockwise (CCW) in axial direction. This is to be distinguished from the downstream and upstream directions along one and the same acoustic path in which the ultrasonic waves are transmitted from each transducer of a pair of transducer, which are CW and CCW directed waves. As already said, two acoustic paths having their transducers at the same side of the conduit body form paired paths. The first and second acoustic paths together form a first set of paired paths. Preferably in an ideal situation the transducers of the first and second swirl sensitive paths respectively are arranged such that the respective acoustic paths have the same starting position and the same end position, but follow different directions, one in the clockwise direction and one in the counter clock wise direction as seen from the same point of view. Practically the transducers of the second pair are axially offset over the same length with respect to the transducers of the first pair. In a similar way a third pair and a fourth pair of transducers, each pair defining a swirl sensitive acoustic path but in different directions, are positioned along third and fourth lines respectively, which are tangentially staggered to the first and second lines. The third and fourth lines preferably are at the same positon. The third and fourth paths form a second set of paired paths.

Preferably lines along which the transducers of the two paired paths are positioned, are tangentially staggered over 180°, in other words the two sets of paired paths are on opposite sides of the pipe. The pairs of transducers are preferably arranged such that the two pairs of paired paths establish a fully rotational symmetrical path layout, more preferably the two pair of paired paths create a mirror-symmetrical path layout, i.e. each swirl sensitive acoustic path has a mirror-symmetrical counterpart.

The purpose of the swirl sensitive paths is enabling detection of swirl (cross flow). A swirl sensitive acoustic path generally comprises a trajectory having two or more reflections against the inner wall of the conduit body. In a preferred embodiment the swirl sensitive acoustic paths are triangular acoustic paths in axial projection (thus paths having two reflections), more preferably an equilateral triangle having legs being midradius chords in a circular conduit body. For sake of simplicity the invention will be described using this preferred triangular path configuration.

A triangular path measures in three different planes along the three legs of the triangle. In order to improve accuracy and being able to fully compensate any flow profile changes in the axial direction of the conduit tube each leg in a plane is provided with a mirrored leg. Accordingly in the device according to the invention each swirl sensitive path as known from the abovementioned prior art device has its own symmetrical path. Thus each clockwise swirl sensitive path has a counter clockwise path. Due to the fully symmetrical arrangement of the acoustic paths the device according to the invention, effects of asymmetrical swirl, asymmetry and crossflow are compensated regardless of the shape of the distortion and changes in the flow profile along the axial length of the conduit body. Thus the present device is more immune to asymmetrical swirl and profile changes in the axial direction compared to the prior art devices.

The transit times of ultrasonic waves transmitted along the four paths in downstream and upstream direction are measured. The measured times can be used in calculating a flow characteristic of the fluid passing through the conduit. Advantageously at least one of flow velocity and/or throughput is determined, e.g. using the average of the measured times of the four paths completely compensating any asymmetry or axial change of the flow profile. The measured transit times as such, and combinations thereof can be used to establish e.g. the shape of the flow profile.

In addition to the above effect the increase of the number of acoustic paths enhances the repeatability. Even if one acoustic path fails, a fallback based on the prior art device and method is possible.

In a preferred embodiment the first acoustic path and the second acoustic path have the same length. More preferably, the transducers of the first and second set of paired paths are arranged diametrically to each other. Thus in this preferred embodiment all the transducers are mounted to the conduit body in two lines opposite to each other and as seen in longitudinal projection the positions of the transducers of the first set of paired paths overlap the positions of the transducers of the second set of paired paths. Due to the preferred small axial displacement of the transducers of a set of paired paths or even equal positions of the transducers reduction of costs of additional transducer housings, cabling and the like is possible. Preferably single multiple faced type transducers are used for the upstream and downstream transducers of paired paths. It will be understood that one or more additional acoustic paths using an appropriate number of additional pairs of transducers can be present in the device according to the invention. E.g. single reflection path through the axis of the conduit body can be added.

In the preferred embodiment the pairs of transducers of a paired paths are arranged along a single line, thus the set of transducer pairs of paired paths are positioned along two lines along the sides of the conduit body, e.g. at an angle of −90° and +90° respectively from the top.

The method according to the invention comprises the steps of transmitting and receiving ultrasonic waves along a swirl sensitive acoustic path defined by a first pair of transducers, along a second swirl sensitive acoustic path defined by a second pair of transducers, along a third swirl sensitive acoustic path defined by a third pair of transducers and along a fourth swirl sensitive acoustic path defined by a fourth pair of transducers. The transducers of the pairs of transducers are arranged at an axial distance from each other. Thus the acoustic paths extend in the axial direction of the conduit, in which the fluid flows. The transducers of the first and second acoustic paths are arranged on first and second lines at the conduit body wall, which lines are parallel to the conduit body axis and at the same side thereof. The first and second acoustic paths comprise a CW and CCW trajectory as a first set of paired paths. Similarly the transducers of the third and fourth acoustic paths are arranged on third and fourth lines at the wall of the conduit body wall, which lines are also parallel to the conduit body axis, but tangentially staggered with respect to the first and second lines. Preferably the paired lines are diametrically opposite to each other. The third and fourth paths defined by the third pair of transducers and fourth pair of transducers comprise a CW and CCW trajectory as a second set of paired paths. Preferably the transducers are arranged such that the second set of paired paths is symmetrical to the first set of paired paths. A mirror-symmetrical layout is the most preferred embodiment. From the signals received at the receiving transducer the transit time are determined. The transit times determined for each acoustic path can be used in calculation of a flow characteristic, such as flow velocity and/or throughput of for gathering specific information about the actual flow profile, like the absence or presence of swirl, cross flow, profile asymmetry and profile change in axial direction.

The preferred embodiments described above with respect to the device according to the invention are equally applicable to the method according to the invention. Advantageously the acoustic waves are transmitted along an acoustic path in the upstream and downstream directions, the respective transducers acting alternatingly as transmitter and receiver.

BRIEF DESCRIPTION OF THE FIGURES

The present invention will be explained in more detail referring to the attached drawing, wherein.

DETAILED DESCRIPTION

Figure 1:
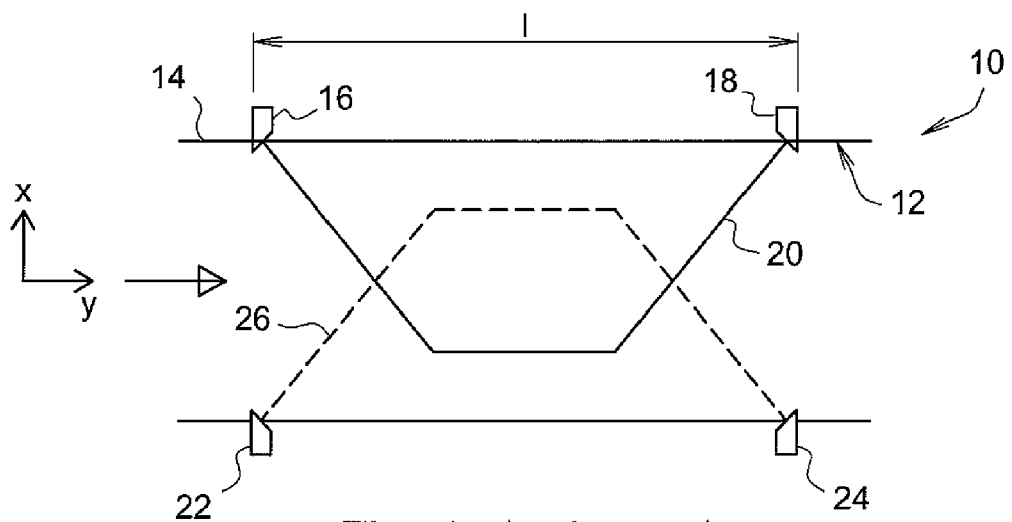
FIG. 1 shows a longitudinal projection of an embodiment of a flow meter having swirl sensitive paths according to the prior art.
Figure 2:
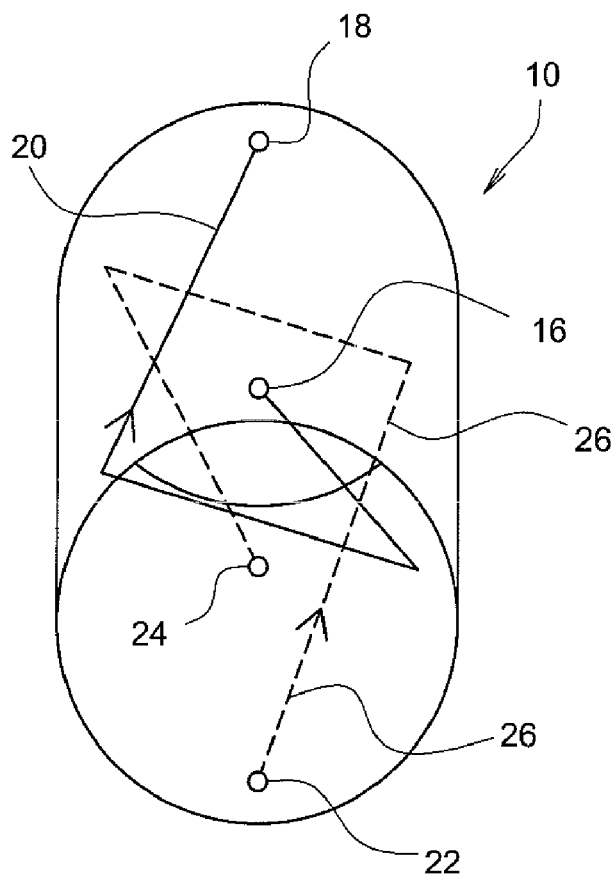
FIG. 2 shows the acoustic paths of the embodiment of FIG. 1 in a perspective view.
Figure 3:
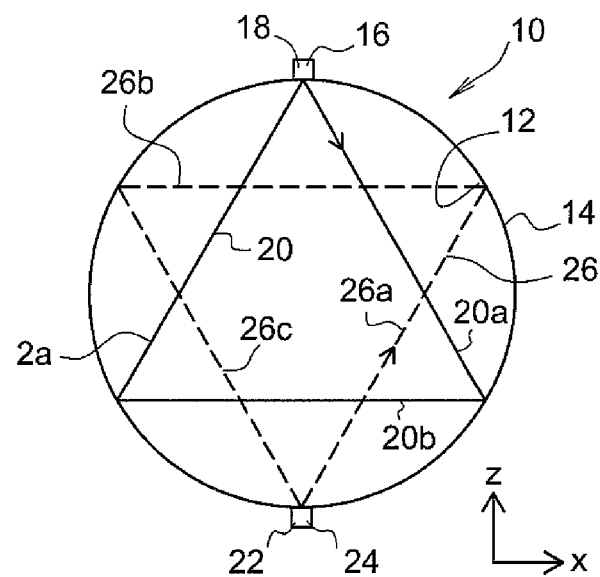
FIG. 3 is an axial projection of the acoustic paths of the embodiment of FIG. 1.

FIG. 1 shows a cylindrical conduit body 10 having an internal wall 12 and an external wall 14. A fluid e.g. natural gas flows through the interior of the conduit body 10 in the direction indicated by an arrow. A first pair of transducers 16 and 18 is arranged at the top of external wall 14 at an axial distance 1 from each other. The upstream first transducer 16 and downstream first transducer 18 together define a first swirl sensitive acoustic path 20 (solid line) comprising two reflections against the inner wall 12 (an equilateral triangle). As is apparent from FIG. 2, the first swirl sensitive acoustic path 20 has a clockwise direction, seen in the flow direction of the fluid. A second pair of transducers 22 and 24 is arranged opposite (staggered tangentially about 180°) the first pair at the bottom of the external wall 14 at the same axial distance 1 from each other. The upstream second transducer 22 and the downstream second transducer 24 together define a second swirl sensitive acoustic path 26 (dashed line) with two reflections against the inner wall 12, thus having the shape of an equilateral triangle. From FIG. 2 it is apparent, that this second acoustic path 26 has a counter clockwise configuration, as seen in the direction of flow. As is apparent from FIGS. 1 and 3 the CW path 20 does not reach into the conduit part, which is beneath the horizontal leg 20b. Similarly the CCW path 26 does not reach into the conduit part, which is above the horizontal leg 26b. Assuming an asymmetrical flow profile along the x-axis having a higher velocity at the positive z-axis (i.e. the upper half of the conduit body) the CCW path 26 "experiences" more of the higher velocity than the CW path 20, because the travel length of an ultrasonic wave transmitted along the CCW path 26 in the upper half of the conduit body (assuming the equilateral triangular path has a total length of 3) is 5/3 (=1 (leg 26c)+⅓ (leg 26a)+⅓ (leg 26c)), while the CW path covers only a length of 4/3 in the upper half of the conduit body. In the lower half of the conduit body, where the flow velocity is lower than the flow velocity in the upper half, the CW path 20 experiences more of the lower flow velocity over a length 5/3 compared to 4/3 for the CCW path compensating the weighting of the CCW path reading. Thus the average flow velocity of the two paths 20 and 26 will have a good accuracy. However, as the difference between individual transit times of ultrasonic waves sent in the same flow direction along the CW and CCW paths are compared, the result is interpreted as a swirling flow instead of an asymmetric flow.

Figure 4:
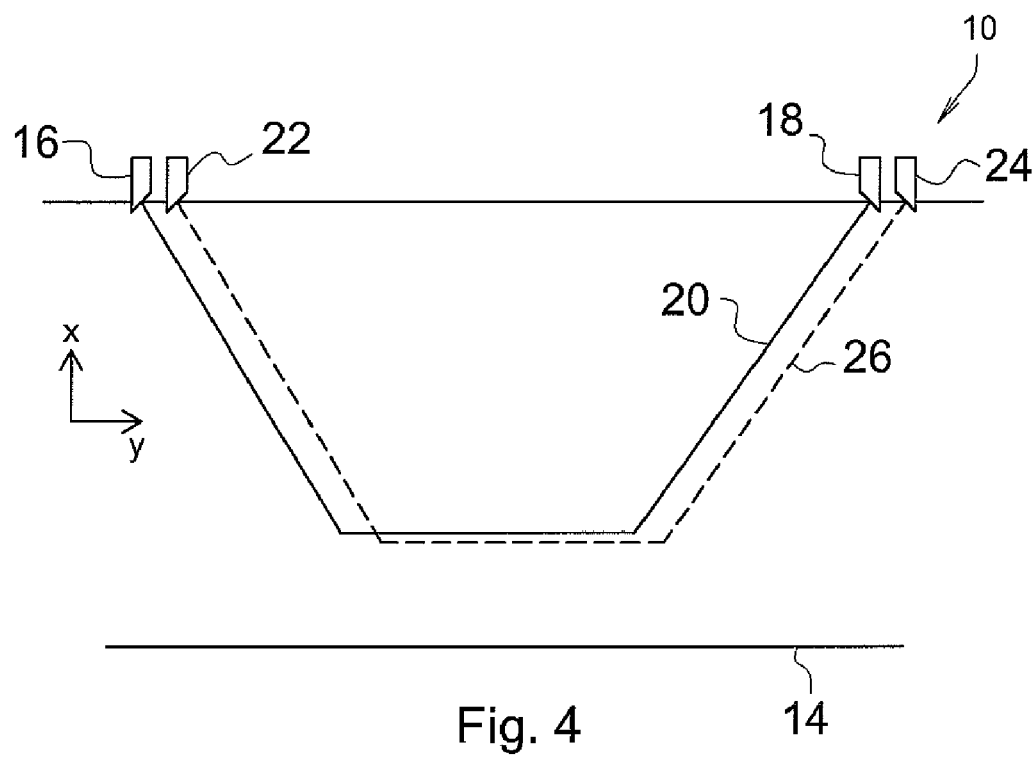
FIG. 4 shows a longitudinal section of another embodiment of a flow meter having swirl sensitive paths not according to the invention.
Figure 5:
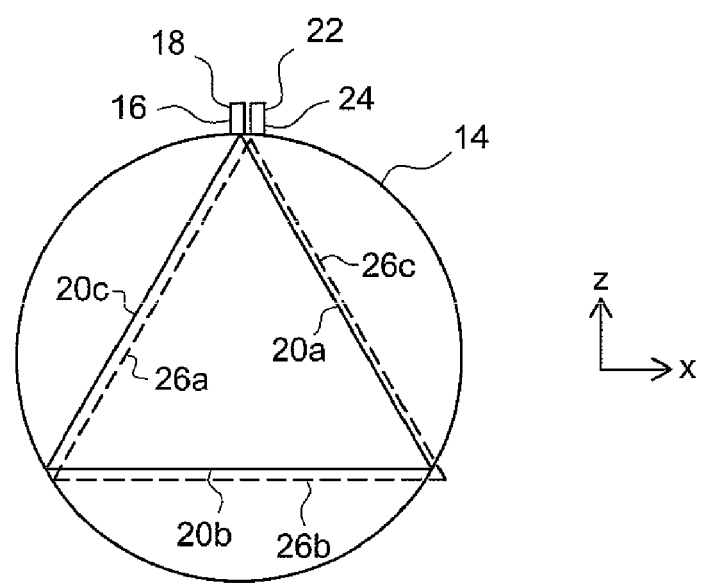
FIG. 5 shows an axial projection of the acoustic paths of the embodiment of FIG. 4.

Now FIGS. 4 and 5 show a situation where the transducers 16, 18 and 22, 24 are mounted along an imaginary line parallel to the conduit axis on the same side of the conduit body 10. For sake of illustration the positions of the second transducers 22, 24 having a CCW triangular path 26 are axially offset compared to the positions of the first transducers 16, 18 defining a CW triangular path 20. The paths 20 and 26 are not mirror symmetrical along the y-axis. In this configuration both paths 20 and 26 do not reach the lower part of the conduit body 10 below the legs 20b and 26b. Again assuming an asymmetric flow profile having a higher flow velocity in the upper half of the conduit body 10 (positive z-axis) the travel length for each of both CW and CCW paths is 5/3 in the lower half of the conduit body 10, where the lower flow velocity prevails, while the travel length in the upper half is 4/3 for each path. In this configuration swirl will not be detected from the individual transit times of acoustic waves transmitted along the two paths in the same direction of fluid flow. However, upon calculation of the average flow velocity from the transmitted times along the two paths in upstream and downstream direction, the lower flow velocity will be overweighted, resulting in an underreading of the real flow velocity.

Thus if there is an asymmetrical flow or a flow profile change in axial direction between the positions of the various transducers, this will result in a less accurate determination of the intended flow characteristics, in the assumed situation either determination of the actual flow profile or calculation of the flow velocity.

Figure 6:
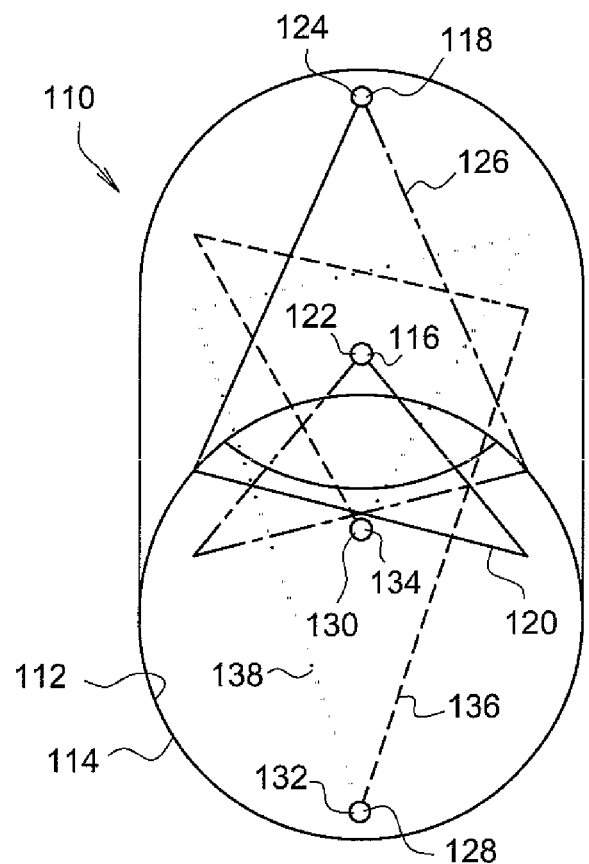
FIG. 6 shows an embodiment of a device according to the present invention in perspective view.

FIG. 6 shows an embodiment of a device according to the present invention. This embodiment of a flow meter according to the invention comprises a cylindrical conduit body 110 having an inner wall 112 and an outer wall 114. A first pair of first transducers 116 and 118 is mounted to the outer wall 114 spaced apart by axial distance 1. The positions of the first transducers 116 and 118 are situated on an imaginary first line parallel to the conduit axis (y-axis). These transducers 116 and 118 define a first swirl sensitive acoustic path 120 (drawn as a solid line) having the shape of an equilateral triangle axially extended in clockwise direction. A second pair of second transducers 122 and 124 is also mounted to the outer wall 114 at positions along the same line, in the situation shown in FIG. 6 at the same positions as the first pair of transducers. The transducers 122 and 124 define a second swirl sensitive acoustic path 126 (dotted dashed line) having the shape of an equilateral triangle axially extended in counter clockwise direction. A third pair of third transducers 128 and 130 and a fourth pair of transducers 132 and 134 are arranged diametrically opposite to the transducers 116, 118, 122 and 124 of the first and second pairs of transducers. The third swirl sensitive acoustic path 136 (dashed line) defined between the third transducers 128 and 130 is mirror-symmetrical to the first acoustic path 120. The third swirl sensitive path 136 extends in the longitudinal direction of conduit body 10 in counter clockwise direction and has the shape of an equilateral triangle. The fourth pair of transducers 132 and 134 define a fourth swirl sensitive path 138 (dotted line) having an equilaterally triangular shape. This fourth path 138 is mirror-symmetrical to the second acoustic path 126. Thus the four acoustic paths 120, 126, 136 and 138 have a symmetrical layout.

Figure 7:
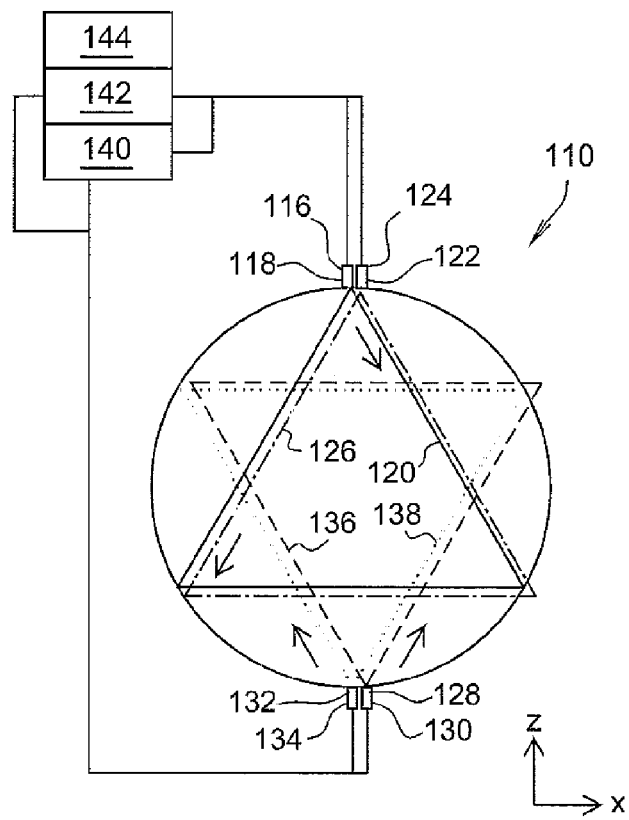
FIG. 7 shows an axial projection of the acoustic paths of the embodiment shown in FIG. 6.
Figure 8:
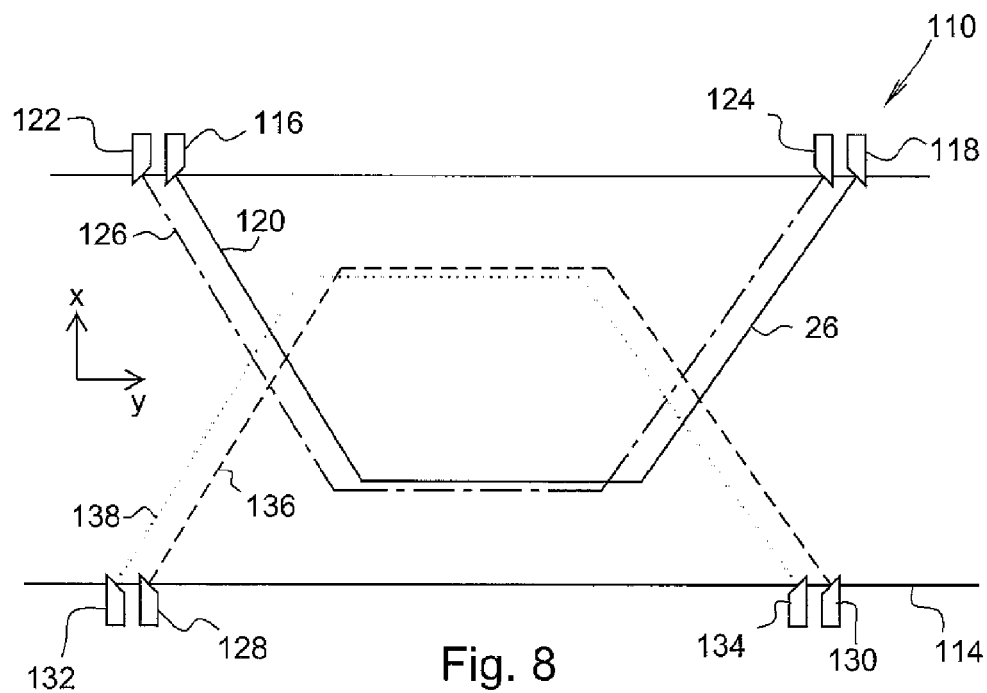
FIG. 8 shows a longitudinal projection of the embodiment shown in FIG. 6.

FIGS. 7 and 8 show a longitudinal projection and an axial projection thereof, wherein the positions of the first transducers 116 and 118 are axially offset with respect to the positions of the second transducers 122 and 124, and on different lines tangentially offset over a very small angle, which is a situation frequently encountered in practice because of the space requirements of the transducers. Furthermore this embodiment of a device according to the invention comprises control means 140 including timing circuitry (not shown separately) for controlling the emission of ultrasonic waves or bursts thereof are connected to the transducers, as well as measuring means 142 for measuring the transit times from the signals received from the transducers and computation means 144 for calculating a flow characteristic of the fluid, such as the flow velocity. For sake of clarity these parts are only shown in FIG. 7.

As each swirl sensitive acoustic path has fully mirror-symmetrical counterpart, flow profile asymmetry and axially changes can be fully compensated and/or eliminated.

The below table compares the ability of the various acoustic path configurations shown above to determine certain flow characteristics.

| Comparison table | | | |
|---|---|---|---|
| Flow effect | 2 swirl paths at the same side (FIGS. 4-5) | 2 swirl paths at opposite sides (FIGS. 1-3) | Symmetrical paired swirl paths |
| Asymmetry along z-axis | −−[1] | − | ++ |
| Asymmetry along x-axis | + | + | + |
| Symmetrical swirl | + | + | + |
| Asymmetrical swirl | − | −−[2] | + |

[1] Pronounced wrong average velocity measurement
[2] Causes wrong average velocity measurement and swirl profile determination

What is claimed is:

1. Device for determining a flow characteristic of a fluid in a conduit, comprising: a conduit body, a first pair of ultrasonic transducers defining a first swirl sensitive acoustic path, a second pair of ultrasonic transducers defining a second swirl sensitive acoustic path, the ultrasonic transducers of the first pair and the second pair being positioned along a first line and a second line at the wall of the conduit body, the first and second lines being parallel to the conduit axis and at the same side of the conduit body, the first and second swirl sensitive paths having a clockwise and a counter clockwise orientation respectively as seen in axial direction, a third pair of ultrasonic transducers defining a third swirl sensitive acoustic path, a fourth pair of ultrasonic transducers defining a fourth swirl sensitive acoustic path, the ultrasonic transducers of the third pair and the fourth pair being positioned along a third line and a fourth line at the wall of the conduit body parallel to the conduit axis, the third and fourth swirl sensitive paths having a clockwise and a counter clockwise orientation respectively as seen in axial direction, the third and fourth lines being at the same side of the conduit body and tangentially staggered with respect to the first and second lines, the transducers of each pair being arranged spaced apart in the axial direction of the conduit body and the acoustic paths extending in the axial direction of the conduit body, wherein the transducers are capable of acting individually as a transmitter and receiver for transmitting ultrasonic waves along their respective acoustic paths and receiving thereof, and means for measuring the transit times of transmitted ultrasonic waves and for determining a flow characteristic from the measured transit times.

2. Device according to claim 1, wherein the first and second lines are at the same position and the third and fourth lines are at the same positions.

3. Device according to claim 1, wherein the first and second lines are diametrically opposite to the third and fourth lines.

4. Device according to claim 1, wherein paired first and second acoustic paths are symmetrical to paired third and fourth acoustic paths.

5. Device according to claim 1, wherein the swirl sensitive acoustic paths comprise equilateral triangular acoustic paths.

6. Device according to claim 1, wherein the transducers of paired paths are combined into a single multiple faced transducer.

7. Method of measuring a flow characteristic of a fluid in a conduit comprising: transmitting and receiving ultrasonic waves in opposite directions along first, second, third and fourth swirl sensitive acoustic paths, the acoustic paths extending in the axial direction of the conduit between associated pairs of ultrasonic transducers, the transducers of each pair being arranged spaced apart in the axial direction of the conduit, the ultrasonic transducers of the first pair and the second pair being positioned along a first line and a second line at the wall of the conduit the first and second lines being parallel to the conduit axis and at the same side of the conduit, the first and second swirl sensitive paths having a clockwise and a counter clockwise orientation as seen in axial direction, a third pair of ultrasonic transducers defining a third swirl sensitive acoustic path, a fourth pair of ultrasonic transducers defining a fourth swirl sensitive acoustic path, the ultrasonic transducers of the third pair and the fourth pair being positioned along a third line and a fourth line at the wall of the conduit parallel to the conduit axis, the third and fourth swirl sensitive paths having a clockwise and a counter clockwise orientation as seen in axial direction, the third and fourth lines being at the same side of the conduit and tangentially staggered with respect to the first and second lines, the transducers of each pair being arranged spaced apart in the axial direction of the conduit and the acoustic paths extending in the axial direction of the conduit, wherein the transducers are capable of acting individually as a transmitter and receiver for transmitting ultrasonic waves along their respective acoustic paths and receiving thereof, measuring the transit times of the transmitted ultrasonic waves and determining the flow characteristic, in particular the flow velocity and/or throughput from the measured transit times.

8. Method according to claim 7, wherein the swirl sensitive acoustic paths comprise triangular acoustic paths.

9. Method according to claim 7, wherein acoustic waves are transmitted along an acoustic path in upstream and downstream directions, the respective transducers alternatingly acting as a transmitter and receiver.

* * * * *